United States Patent [19]
Riney

[11] Patent Number: 5,247,916
[45] Date of Patent: Sep. 28, 1993

[54] ROTARY ENGINE

[76] Inventor: Ross W. Riney, #2 Mandarin Cove, Lucas, Tex. 75002

[21] Appl. No.: 19,061

[22] Filed: Feb. 18, 1993

Related U.S. Application Data

[63] Continuation of Ser. No. 831,425, Feb. 5, 1992, abandoned.

[51] Int. Cl.⁵ ............................................. F02B 53/00
[52] U.S. Cl. ..................................... 123/222; 123/237
[58] Field of Search ................... 60/39.6; 123/222, 237

[56] References Cited

U.S. PATENT DOCUMENTS

| 1,015,663 | 1/1912 | Bonsteel . |
| 2,124,542 | 7/1938 | Chisholm . |
| 3,215,129 | 11/1965 | Johnson . |
| 3,791,352 | 2/1974 | Takacs . |
| 3,902,465 | 9/1975 | Stookey . |
| 4,515,123 | 5/1985 | Taylor . |
| 4,739,615 | 4/1988 | Staheli ................................ 60/39.6 |
| 4,848,295 | 7/1989 | Loran et al. ........................ 123/222 |

FOREIGN PATENT DOCUMENTS

| 726275 | 10/1942 | Fed. Rep. of Germany ...... 123/222 |
| 817058 | 10/1951 | Fed. Rep. of Germany ...... 123/237 |
| 822312 | 11/1951 | Fed. Rep. of Germany ...... 123/237 |
| 796601 | 6/1958 | United Kingdom ................ 123/222 |
| 1531541 | 11/1978 | United Kingdom ................ 123/237 |

Primary Examiner—Michael Koczo
Attorney, Agent, or Firm—Baker & Botts

[57] ABSTRACT

A rotary engine is provided comprising a housing (12) and a rotor (14) comprising a compression eccentric (20) and a power eccentric (22). Gases are compressed within the space formed by the housing (12), the compression eccentric (20) and a compression gate (72), after being introduced through an intake manifold (28). Gases are transferred from the compression eccentric to the power eccentric through a rotary combustion chamber (36), in which combustion of the gases is initiated by an ignition device. Expanding gases cause rotation of the rotor (14) by expanding in the space formed by the housing (12), power eccentric (22) and a power gate (66). Gases exit from the power eccentric (22) through an exhaust port (80).

18 Claims, 3 Drawing Sheets

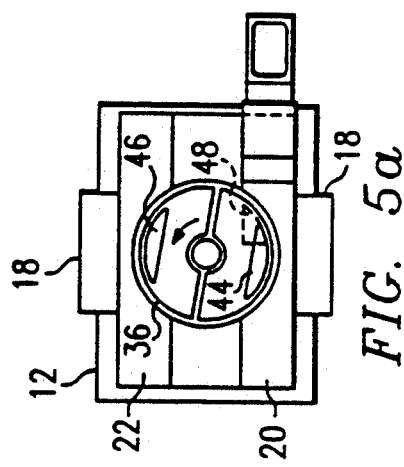
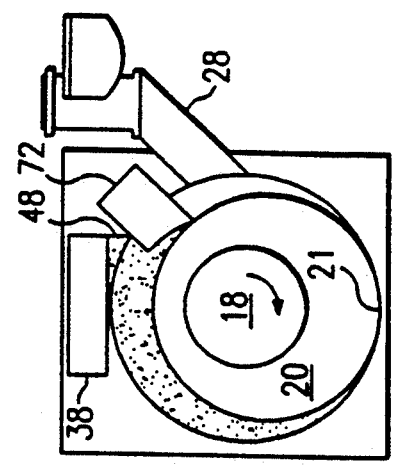
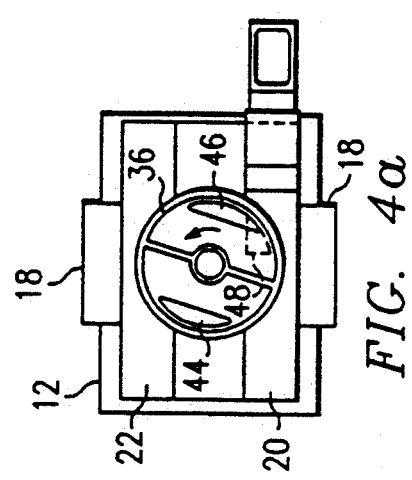
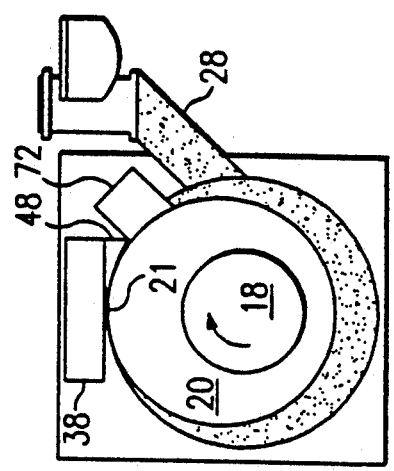
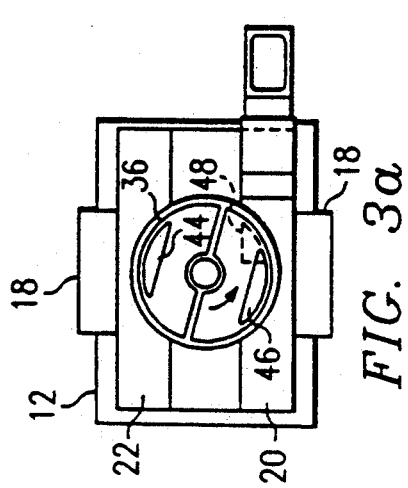
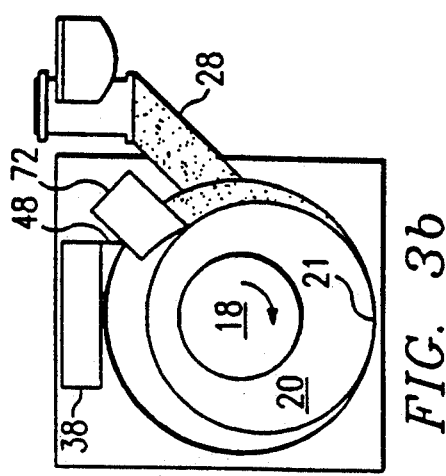

ROTARY ENGINE

RELATED APPLICATIONS

This is a continuation application of U.S. Ser. No. 07/831,425 filed Feb. 5, 1992 by Ross W. Riney entitled "Rotary Engine", now abandoned.

TECHNICAL FIELD OF THE INVENTION

This invention relates generally to internal combustion engines, and in particular to rotary engines.

BACKGROUND OF THE INVENTION

Needs for more efficient and powerful internal combustion engines are ever present. Rotary engines have proven to be important alternatives to conventional piston-type engines.

The efficiency of an engine is based in part on whether it makes full use of the energy available from the expansion of combusted gases. Limitations in the size of the available volume for gas expansion during combustion has been a problem in making full use of the energy available from the combustion of gases in existing rotary engines. Accordingly, one efficiency limitation results when exhaust occurs before the combusted gases have completely expanded, i.e., before the power stroke has completed.

Therefore, a need has arisen for a rotary engine that, through the efficient use of space in a same engine, provides a relatively large volume for gas expansion to take advantage of the available energy from the combustion of gases.

SUMMARY OF THE INVENTION

In accordance with the present invention, a rotary engine is provided which comprises a rotor housed within a housing. The rotor comprises a compression eccentric and a power eccentric spaced apart from each other. Gases are conveyed into the housing through an intake manifold. Gases are compressed in the space formed by the housing, the compression eccentric, and a compression gate that remains in contact with the compression eccentric at all times. A rotating combustion chamber transfers gases from the compression eccentric to the power eccentric. During this transfer, an ignition device ignites gases in the rotating combustion chamber before they are transferred to the power eccentric. These ignited gases expand in the space formed by the power eccentric, the housing, and a power gate that is in contact with the power eccentric at all times. Gases exit the power eccentric through an exhaust port aligned with the power eccentric.

An important technical advantage of a rotary engine according to the present invention inheres in the fact that a substantial portion of the available energy from combusting gases is utilized before exhaust.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3a through 6b are schematic cross-sectional views of the compression stroke in an engine constructed according to the teachings of the present invention.

DETAILED DESCRIPTION OF THE INVENTION

Figure 1:
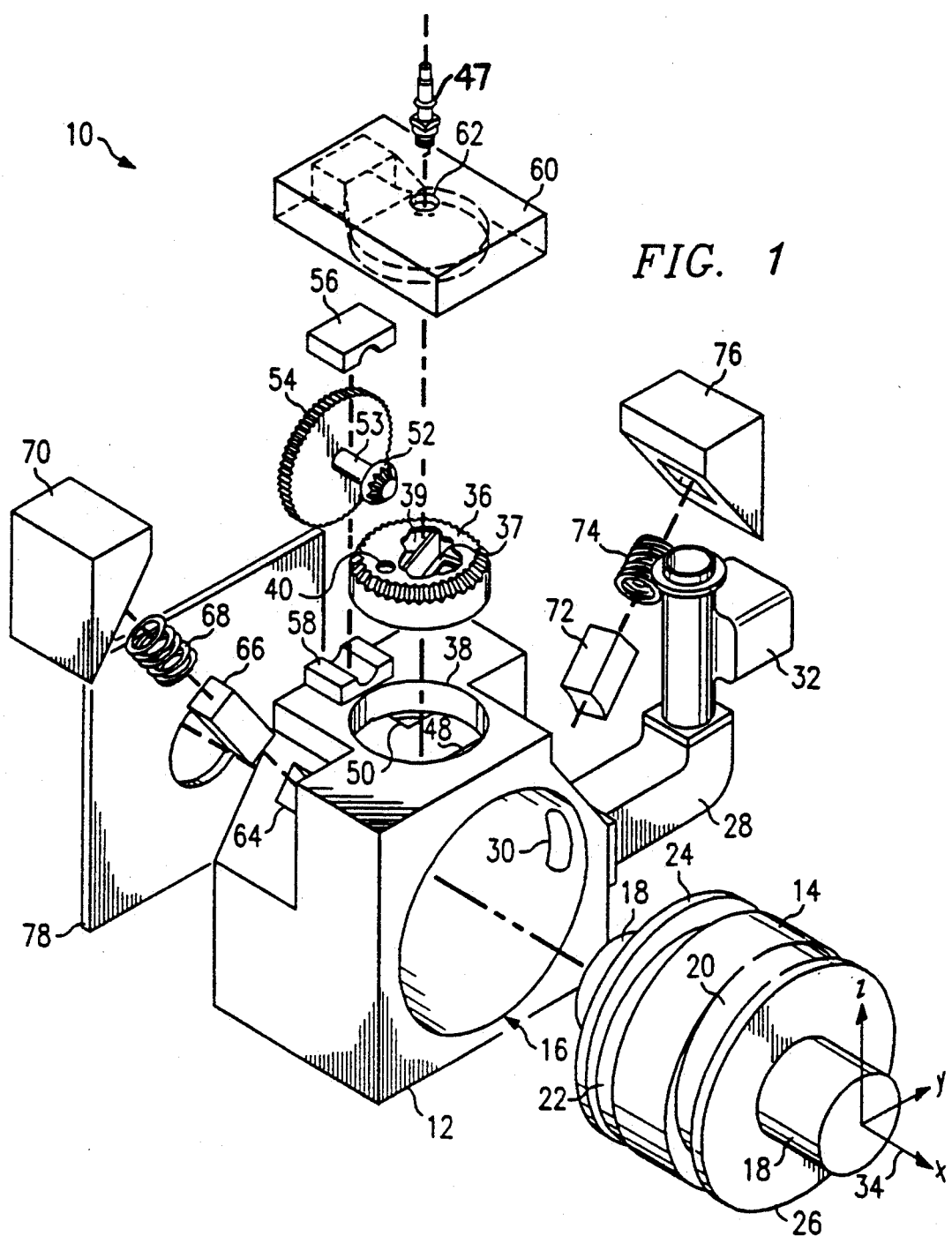
FIG. 1 is an exploded view of a rotary engine constructed according to the teachings of the present invention.

The preferred embodiment of the present invention and its advantages are best understood by referring to FIGS. 1 through 8b of the drawings, like reference characters being used for like parts in the various drawings.

FIG. 1 is an exploded view of a rotary engine, indicated generally at 10, that is constructed according to the teachings of the present invention. In general, operation of the engine occurs within a housing or engine block 12. A rotor 14 rotates within a bore 16 of the housing 12. The rotor 14 may be rotatively supported within the housing 12 by separate bearings (not shown) or by closely controlling the tolerances between the exterior of the rotor 14 where it fits into the housing 12. The rotor 14 comprises a shaft 18 of a smaller diameter than the rotor 14 and extending concentrically outward from each end of the rotor 14. Useful advantage of the rotary engine 10 may be gained by mechanical connection of various systems to the shaft 18. For example, the rotation of the shaft 18 may be used to power an automobile.

Figure 7B:
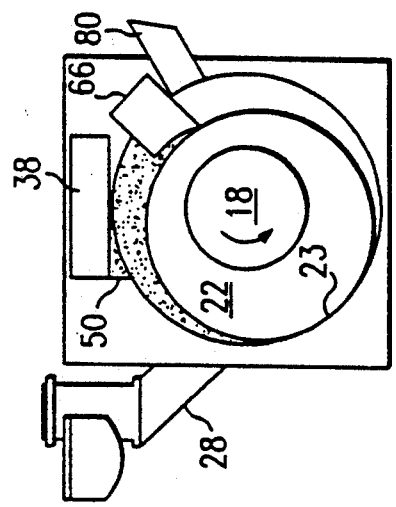

The rotor 14 also comprises a compression eccentric 20 and a power eccentric 22 formed in the rotor 14. Each of these eccentrics are of a diameter smaller than the outer periphery of the rotor 14 and are tangential to the rotor 14 (the eccentric 20 is tangent at a tangential point 21, and the eccentric 22 is tangent at a tangential point 23, as shown in FIGS. 3b and 7b, respectively). Furthermore, the eccentrics 20 and 22 are 180 degrees out of phase, such that 180 degrees separates the tangential point 21 from the tangential point 23.

Two annular seals 24 and 26 are located on the periphery of the rotor 14 to seal pressures generated by the compression and power strokes within the housing 12. A seal between the housing 12 and rotor 14 is formed by closely held tolerances or a separate annular seal (not shown) can be used on the rotor 14 between the eccentrics 20 and 22 to seal the pressure across the rotor 14 between the eccentrics 20 and 22.

An intake manifold 28 is connected to the housing 12 to allow gases (such as an air/fuel mixture) into the housing 12 through a bore 30. Gases entering through the intake manifold 28 may come from, for example, a fuel injector or a carburetor system 32. The bore 30 is aligned in the x-direction 34 with the compression eccentric 20, and has a width in the x-direction 34 less than the width of the eccentric 20. The orientation of the direction axis 34 is illustrated in FIG. 1.

A rotating combustion chamber 36 rotates within a bore 38 in the housing 12. As shown by the cutaway view of the rotating combustion chamber 36, it is divided into two distinct D-shaped chambers 37 and 39.

Figure 2A:
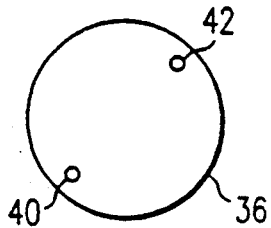
FIGS. 2a and 2b are top and bottom schematic illustrations of a rotating combustion chamber constructed according to the teachings of the present invention.
Figure 2B:
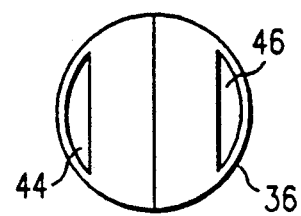
Figure 7A:
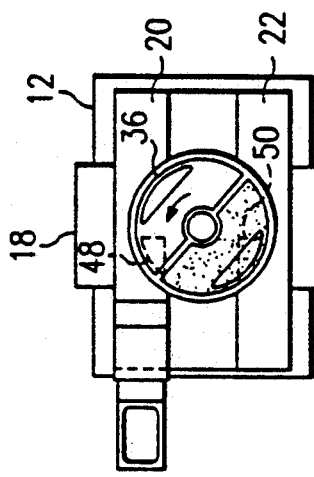
FIGS. 7a through 8b are schematic cross-sectional views illustrating the power stroke of an engine constructed according to the teachings of the present invention.
Figure 8A:
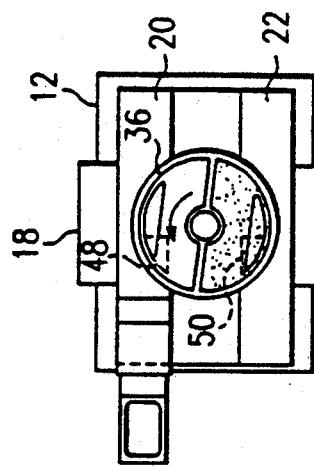

FIGS. 2a and 2b show top and bottom views of the rotating combustion chamber 36. As shown in FIG. 2a, two ignition apertures 40 and 42 are formed in the top of the rotating combustion chamber 36. An ignition device, such as a spark plug 47 (see FIG. 1), ignites gases in each of the chambers 37 and 39 of the rotating combustion chamber 36 through the appropriate ignition aperture 40 or 42. A D-shaped slot is formed in the bottom of each of the two chambers of the rotating combustion chamber 36 as shown in FIG. 2b, shown by references 44 and 46. The length of the slots 44 and 46 must be less than the distance between the compression eccentric 20 and the power eccentric 22, to ensure isolation of the pressures in those eccentrics.

In operation, the rotating combustion chamber 36 transfers gases compressed in the compression eccentric 20 to the power eccentric 22. Gases enter and exit the chambers of the rotating combustion chamber 36 through the D-shaped slots 44 and 46. Gases exit the compression eccentric 20 through a slot 48 (see FIG. 1) formed from the bottom of the bore 38 in the housing 12 into the bore 16. The slot 48 is narrower in the x-direction 34 than the eccentric 20 is in the x-direction 34. Gases are transferred to the power eccentric 22 from the rotating combustion chamber 36 through a slot 50. The slot 50 is formed in the housing 12 to permit gas flow from the bore 38 through the housing 12 into the bore 16. The slot 50 is narrower in the x-direction 34 than is the power eccentric 22.

The rotating combustion chamber 36 rotates at one-half the speed of the rotor 14, and is driven by a bevel gear 52 mounted on a shaft 53. The shaft 53 also carries a gear 54, which is driven by the shaft 18. A bearing mounted on the housing 12 includes a top half or cap 56 and a bottom half 58 that supports the shaft 53 for rotation between the gear 54 and the bevel gear 52.

A combustion chamber head 60 is affixed to the housing 12 and houses the rotating combustion chamber 36 and the drive assembly. An aperture 62 is formed in the combustion chamber head 60 to receive the spark plug 47.

An opening 64 extends radially through the housing 12 to the bore 16 in the same position in the x-direction 34 as power eccentric 22. The width of the opening 64 in the x-direction 34 is less than the width of the power eccentric 22 in the x-direction 34.

A power gate or seal 66 projects through the opening 64 and contacts the surface of the eccentric 22. The surface of the power gate 66 that is in contact with the eccentric 22 is contoured so as to match the surface of the power eccentric at the time of power release, as will be described below. The power gate 66 is urged toward constant sliding contact with the power eccentric 22 through use of a spring 68, although other forces, such as hydraulic, pneumatic or electrical forces, could be used to perform the function of spring 68. The spring 68 in turn is mounted in a housing 70, which encloses the spring 68 and the power gate 66.

A compression gate opening similar to aperture 64 (not shown in FIG. 1) extends radially through the housing 12 into the bore 16 to receive a compression gate or seal 72. The compression gate opening and the compression gate 72 are aligned with the compression eccentric 20. The compression gate 72 is located through the housing 12 in the same position in the x-direction 34 as the compression eccentric 20. The width of the unshown opening and the compression gate 72 in the x-direction 34 is less than that of the eccentric 20 in the x-direction 34. The surface of the compression gate 72 in contact with the eccentric 20 is contoured so as to match the surface of the eccentric 20 during full compression, as will be discussed below. The compression gate 72 is urged toward sliding contact with the eccentric 20 by a spring 74, which in turn is mounted in a housing 76. The housing 76 houses the compression gate 72 and the spring 74.

Two housing end plates 78 (only one shown in FIG. 1) are coupled to the ends of the housing 12 to seal the housing 12. Bearings (not shown) can be provided between the end plates 78 and the shaft 18, which extends there through, if desired.

The operation of the rotary engine 10 will be best understood by reference to FIGS. 3a through 8b. FIGS. 3a through 6b illustrate the compression stroke of the rotary engine 10. In these figures, the rotor 14 rotates in a clockwise direction. Referring to FIG. 3b, gases (for example, an air/fuel mixture) enter the housing 12 through the intake manifold 28. As the eccentric 20 rotates, a space having a varying volume is created by the surfaces of the eccentric 20, the housing 12 and the compression gate 72. As shown in FIG. 4b, the eccentric 20 has rotated such that complete intake has occurred. In FIGS. 3b and 4b, intake gases are represented by stippling.

Figure 6A:
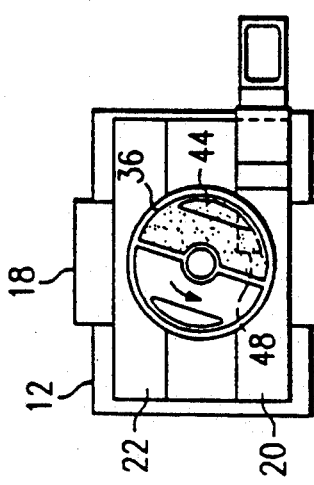
Figure 6B:
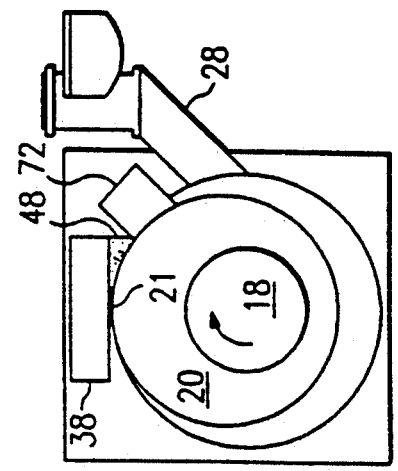

FIG. 5b represents the position of the eccentric 20 as compression begins. In FIG. 5b, the tangential point 21 of the eccentric 20 has rotated past the intake manifold, thereby trapping the gases in the space with varying volume formed by the side of the compression gate 72 nearest slot 48, the eccentric 20 and the housing 12. As the eccentric 20 continues its rotation, as shown in FIG. 6b, the gases are completely compressed when the tangential point 21 of the eccentric 20 nears the compression gate 72. As shown in FIG. 6b, the compression gate 72 is in full contact with eccentric 20.

While the rotor 14 and the compression eccentric 20 are rotating, the rotary combustion chamber 36 also rotates as shown in FIGS. 3a, 4a, 5a, and 6a. As the rotary combustion chamber 36 rotates, the D-shaped slot 44 passes over the slot 48 allowing compressed intake gases to enter into one of the chambers of the rotating combustion chamber 36, as shown in FIG. 5a. As the rotating combustion chamber 36 continues its rotation, D-shaped slot 44 continues and completely passes over the slot 48, thereby completely receiving all of the compressed gas from the compression eccentric 20. This compressed gas is then ignited by the plug 47 as the ignition aperture 40 passes under the aperture 62. As the rotating combustion chamber 36 continues its rotation, the ignited gases are directed to the power eccentric side of the rotor 14 as shown in FIGS. 7a, 7b, 8a and 8b. FIGS. 7a, 7b, 8a and 8b are "back" views with respect to FIGS. 3a–6b, such that the figures have been rotated 180°.

Figure 8B:
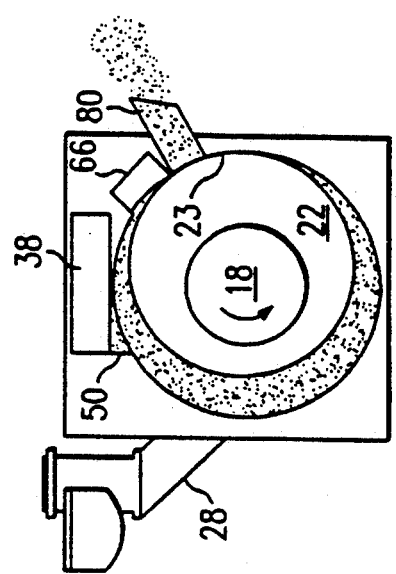

As the D-shaped slot 44 passes over the slot 50, the ignited gases expand into the variable volume space formed by the power gate 66, the eccentric 22 and the housing 12. These combusting and expanding gases impart energy to the eccentric 22, thereby causing rotation. As the eccentric 22 and the rotor 14 rotate, the combusted gases are released through an exhaust port 80 as shown in FIG. 8b, the stippling indicating exhaust through exhaust port 80 when tangential point 23 passes the exhaust port 80.

Because the variable volume space formed by the power gate 66, the eccentric 22, and the housing 12 is relatively large, the efficiency of the rotary engine 10 is high. By using this relatively large space for gas expansion, rotary engine 10 takes advantage of much of the available energy from the expanding gases.

In summary, a rotary engine is provided that comprises a rotor having two out of phase eccentrics, one for compression and the other for power. The rotating combustion chamber 36 transfers gases from the compression eccentric 20 to the power eccentric 22. These gases are ignited within the rotating combustion chamber 36 and the gases then expand into the space formed between the power eccentric 22, the housing 12, and power gate 66 causing rotation of the rotor 14.

Although the present invention has been described in detail, it should be understood that various changes, substitutions and alterations can be made hereto without departing from the spirit and scope of the invention as defined by the appended claims.

What is claimed is:

1. A rotary engine, comprising:
   a housing having two ends and having a bore extending through said ends;
   a rotor including a compression eccentric and a power eccentric, said eccentrics spaced apart and said rotor housed within the bore in said housing and including an axial shaft;
   an intake manifold aligned with said compression eccentric operable to convey gases into a compression space formed between said housing, said compression eccentric, and a compression gate;
   said compression gate disposed adjacent to said compression eccentric and means for maintaining said compression gate in sealing contact with said compression eccentric, such that a compression stroke occurs in said compression space;
   a rotating combustion chamber in communication with said eccentrics and comprising only two chambers, and operable to transfer gases from said compression eccentric to said power eccentric;
   an ignition device coupled to said rotating combustion chamber operable to ignite gases in said rotating combustion chamber;
   a power gate disposed adjacent to said power eccentric and means for maintaining said power gate in sealing contact with said power eccentric; and
   an exhaust port aligned with said power eccentric, such that a power stroke occurs in the space formed by said housing, said power eccentric and said power gate.

2. The engine of claim 1, wherein:
   said means for maintaining said compression gate in sealing contact comprises spring means for biasing said compression gate in contact with said compression eccentric; and
   said means for maintaining power gate in sealing contact comprises spring means for biasing said power gate in contact with said power eccentric.

3. The engine of claim 1, and further comprising means operably connecting said shaft to said rotating combustion chamber whereby said rotating combustion chamber rotates at one-half the rate of said rotor.

4. The engine of claim 3, wherein said means further comprises a gearing mechanism.

5. The engine of claim 4, wherein said gearing mechanism further comprises:
   a gear coupled to said shaft;
   a gear shaft carrying said gear;
   a bearing rotatably supporting said gear shaft;
   a bevel gear mounted on said gear shaft opposite said gear; and
   said rotating combustion chamber further including a gear matingly engaging and rotated by said bevel gear.

6. The engine of claim 1, wherein said rotating combustion chamber includes two slots, each of said slots associated with one of said chambers, such that gases from said compression eccentric enter each chamber through each chamber's associated slot and exit each chamber to said power eccentric through each chamber's associated slot.

7. The engine of claim 1, wherein said compression and power eccentrics are each tangent to said rotor at respective tangential points.

8. The engine of claim 7, wherein said respective tangential points are 180° out of phase.

9. The engine of claim 1, and further including two end plates coupled to respective ends of said housing.

10. A rotary engine comprising:
    a housing having two ends and a bore extending longitudinally through said ends;
    a rotor including a compression eccentric and a power eccentric, said eccentrics spaced apart from each other;
    said rotor disposed within said bore of said housing and said rotor including an axial shaft;
    a intake manifold aligned with said compression eccentric providing means for conveying gases into a compression space formed between said housing, said compression eccentric, and a compression gate;
    said compression gate disposed adjacent to said compression eccentric with means for retaining said compression gate in sealing contact with said compression eccentric whereby a compression stroke occurs in said compression space;
    a rotating combustion chamber in communication with said eccentrics and consisting of two chambers, including means for transferring gases from said compression eccentric to said power eccentric;
    an ignition device coupled to said rotating combustion chamber comprising means for igniting gases in said rotating combustion chamber;
    a power gate disposed adjacent to said power eccentric with means for retaining said power gate in sealing contact with said power eccentric; and
    an exhaust port aligned with said power eccentric, such that a power stroke occurs in a space formed by said housing, said power eccentric and said power gate.

11. The engine of claim 10, wherein:
    said means for maintaining said compression gate in sealing contact comprises spring means for biasing said compression gate in contact with said compression eccentric; and
    said means for maintaining said power gate in sealing contact comprises spring means for biasing said power gate in contrast with said power eccentric.

12. The engine of claim 10, and further comprising means for connecting said shaft to said rotating combustion chamber whereby said rotating combustion chamber rotates at one-half the rate of said rotor.

13. The engine of claim 12, wherein said connecting means further comprises a gearing mechanism.

14. The engine of claim 12, wherein aid gearing mechanism further comprises:
    a gear coupled to said shaft;
    a gear shift carrying said gear;
    a bearing rotatably supporting said gear shaft;

a bevel gear mounted on said gear shaft opposite said gear; and said rotating combustion chamber further including a gear matingly engaging and rotated by said bevel gear.

15. The engine of claim 10, wherein said rotating combustion chamber includes two slots, each of said slots associated with one of said chambers, such that gases from said compression eccentric enter each chamber through each chamber's associated slot and exit each chamber to said power eccentric through each chamber's associated slot.

16. The engine of claim 10, wherein said compression eccentric and said power eccentric are each tangent to said rotor at respective tangential points.

17. The engine of claim 16, wherein said respective tangential points are 180 degrees out of phase.

18. The engine of claim 10, and further including two end plates coupled to respective ends of said rotary housing.

* * * * *